United States Patent
Mermoud et al.

(10) Patent No.: US 10,277,476 B2
(45) Date of Patent: Apr. 30, 2019

(54) OPTIMIZING NETWORK PARAMETERS BASED ON A LEARNED NETWORK PERFORMANCE MODEL

(71) Applicant: Cisco Technology, Inc., San Jose, CA (US)

(72) Inventors: Grégory Mermoud, Veyras (CH); Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 444 days.

(21) Appl. No.: 14/164,876

(22) Filed: Jan. 27, 2014

(65) Prior Publication Data

US 2015/0195136 A1 Jul. 9, 2015

Related U.S. Application Data

(60) Provisional application No. 61/923,910, filed on Jan. 6, 2014.

(51) Int. Cl.
| | |
|---|---|
| *G06N 99/00* | (2010.01) |
| *H04L 12/24* | (2006.01) |
| *H04L 12/805* | (2013.01) |
| *H04L 12/751* | (2013.01) |
| *H04L 12/803* | (2013.01) |
| *H04W 24/04* | (2009.01) |
| *H04L 12/721* | (2013.01) |

(52) U.S. Cl.
CPC ......... *H04L 41/5025* (2013.01); *G06N 99/00* (2013.01); *G06N 99/005* (2013.01); *H04L 41/12* (2013.01); *H04L 45/02* (2013.01); *H04L 47/122* (2013.01); *H04L 47/365* (2013.01); *H04L 45/70* (2013.01); *H04W 24/04* (2013.01); *Y04S 40/164* (2013.01)

(58) Field of Classification Search
CPC ...... G06N 99/00; G06N 99/005; H04L 12/22; H04L 12/26
See application file for complete search history.

(56) References Cited

U.S. PATENT DOCUMENTS

| | | | |
|---|---|---|---|
| 5,970,064 A * | 10/1999 | Clark | H04L 41/0813 370/242 |
| 6,577,597 B1 | 6/2003 | Natarajan et al. | |

(Continued)

OTHER PUBLICATIONS

Zinkevich, Martin, et al. "Parallelized stochastic gradient descent." Advances in neural information processing systems. 2010.*

(Continued)

*Primary Examiner* — Eric Nilsson
(74) *Attorney, Agent, or Firm* — Behmke Innovation Group LLC; James Behmke; Stephen D. LeBarron

(57) ABSTRACT

In one embodiment, a predictive model is constructed by mapping multiple network characteristics to multiple network performance metrics. Then, a network performance metric pertaining to a node in a network is predicted based on the constructed predictive model and one or more network characteristics relevant to the node. Also, a local parameter of the node is optimized based on the predicted network performance metric.

15 Claims, 9 Drawing Sheets

(56) References Cited

U.S. PATENT DOCUMENTS

| | | | |
|---|---|---|---|
| 6,597,684 B1* | 7/2003 | Gulati | H04L 47/783 370/351 |
| 6,694,471 B1 | 2/2004 | Sharp | |
| 6,769,024 B1 | 7/2004 | Natarajan et al. | |
| 6,785,239 B1 | 8/2004 | Tasker | |
| 6,886,040 B1 | 4/2005 | Fitzgerald | |
| 6,961,573 B1 | 11/2005 | Moon et al. | |
| 6,973,034 B1 | 12/2005 | Natarajan et al. | |
| 7,092,410 B2 | 8/2006 | Bordonaro et al. | |
| 7,457,877 B1 | 11/2008 | Shah et al. | |
| 7,568,045 B1 | 7/2009 | Agrawal | |
| 7,606,895 B1 | 10/2009 | Dini et al. | |
| 7,613,128 B2 | 11/2009 | Castagnoli et al. | |
| 7,680,047 B2 | 3/2010 | Vadlakonda et al. | |
| 7,724,676 B2 | 5/2010 | Gerstel et al. | |
| 7,948,910 B2 | 5/2011 | Arbel et al. | |
| 8,005,000 B1 | 8/2011 | Srinivasan | |
| 8,369,213 B2 | 2/2013 | Vasseur et al. | |
| 8,605,591 B2 | 12/2013 | Shaffer et al. | |
| 8,630,177 B2 | 1/2014 | Vasseur et al. | |
| 8,630,291 B2 | 1/2014 | Shaffer et al. | |
| 8,634,314 B2 | 1/2014 | Banka et al. | |
| 8,638,778 B2 | 1/2014 | Lee et al. | |
| 2007/0192065 A1* | 8/2007 | Riggs | G06Q 10/04 702/189 |
| 2009/0019147 A1 | 1/2009 | Ahlers et al. | |
| 2009/0303908 A1* | 12/2009 | Deb | H04W 28/18 370/310 |
| 2011/0082596 A1* | 4/2011 | Meagher | H02J 13/001 700/291 |
| 2011/0085461 A1 | 4/2011 | Liu et al. | |
| 2012/0155475 A1 | 6/2012 | Vasseur et al. | |
| 2012/0233308 A1 | 9/2012 | Van De Houten et al. | |
| 2012/0307653 A1 | 12/2012 | Vasseur et al. | |
| 2013/0022053 A1 | 1/2013 | Vasseur et al. | |
| 2013/0022083 A1 | 1/2013 | Vasseur et al. | |
| 2013/0024560 A1 | 1/2013 | Vasseur et al. | |
| 2013/0028103 A1 | 1/2013 | Hui et al. | |
| 2013/0121331 A1 | 5/2013 | Vasseur et al. | |
| 2013/0159479 A1 | 6/2013 | Vasseur | |
| 2013/0159486 A1 | 6/2013 | Vasseur | |
| 2013/0159550 A1 | 6/2013 | Vasseur | |
| 2013/0201858 A1 | 8/2013 | Varma et al. | |
| 2013/0223229 A1 | 8/2013 | Hui et al. | |
| 2013/0250811 A1 | 9/2013 | Vasseur et al. | |
| 2013/0311673 A1* | 11/2013 | Karthikeyan | H04L 41/147 709/239 |
| 2013/0336126 A1 | 12/2013 | Vasseur et al. | |
| 2013/0336316 A1 | 12/2013 | Sudhaakar et al. | |
| 2014/0003277 A1 | 1/2014 | Shim | |
| 2014/0022928 A1 | 1/2014 | Zingale et al. | |
| 2014/0092753 A1 | 4/2014 | Vasseur et al. | |
| 2014/0207945 A1* | 7/2014 | Galloway | H04L 41/142 709/224 |

OTHER PUBLICATIONS

Gaddour, Olfa, and Anis Koubâa. "RPL in a nutshell: A survey." Computer Networks 56.14 (2012): 3163-3178.*

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

* cited by examiner

A BAYESIAN NETWORK REPRESENTING THE JOINT PROBABILITY
DISTRIBUTION OVER THREE RANDOM VARIABLES; X, Y, AND Z

BN FOR LINEAR REGRESSION

OPTIMIZING NETWORK PARAMETERS BASED ON A LEARNED NETWORK PERFORMANCE MODEL

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a predictive model is constructed by mapping multiple network characteristics to multiple network performance metrics. Then, a network performance metric pertaining to a node in a network is predicted based on the constructed predictive model and one or more network characteristics relevant to the node. Also, a local parameter of the node is optimized based on the predicted network performance metric.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
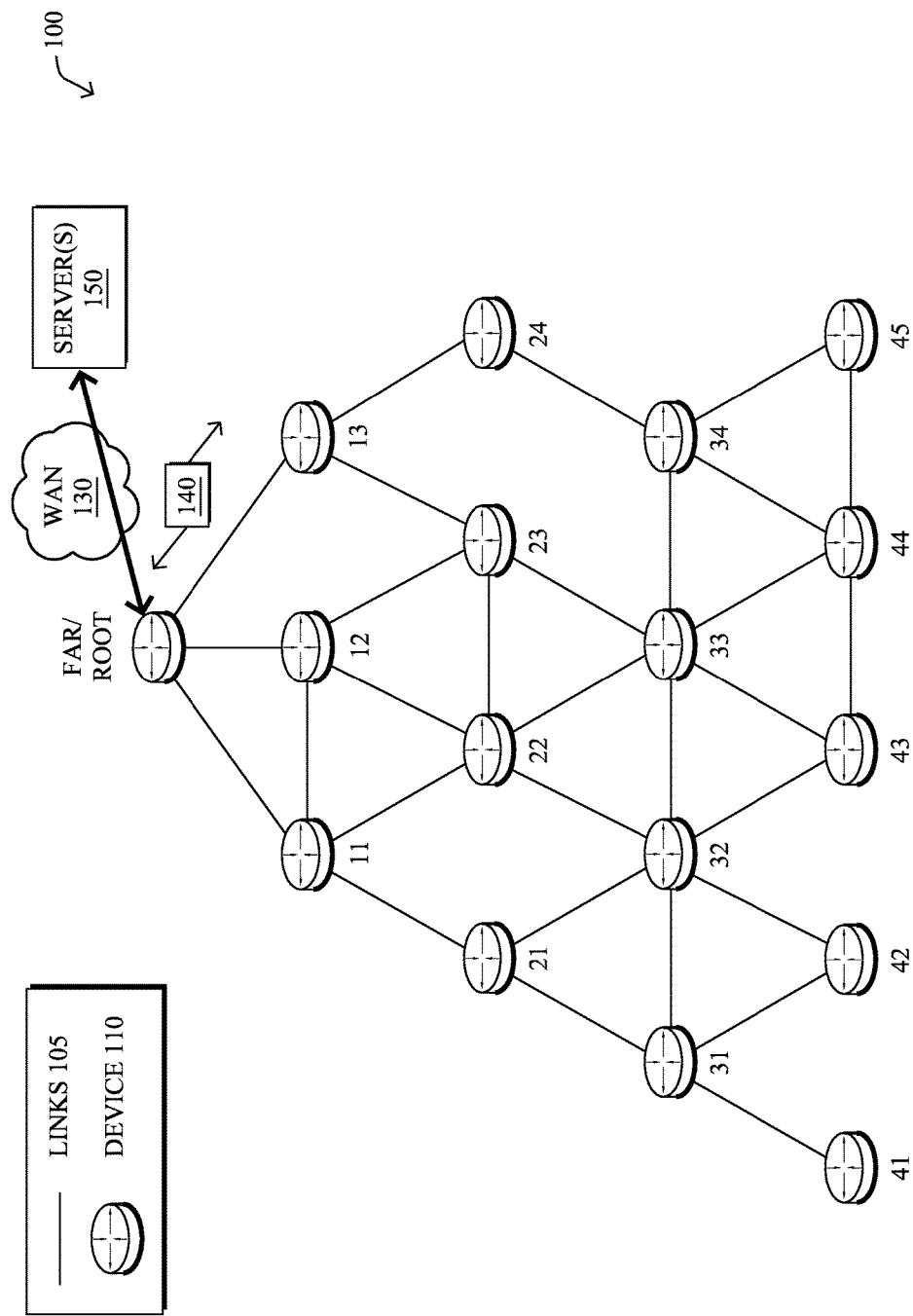
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
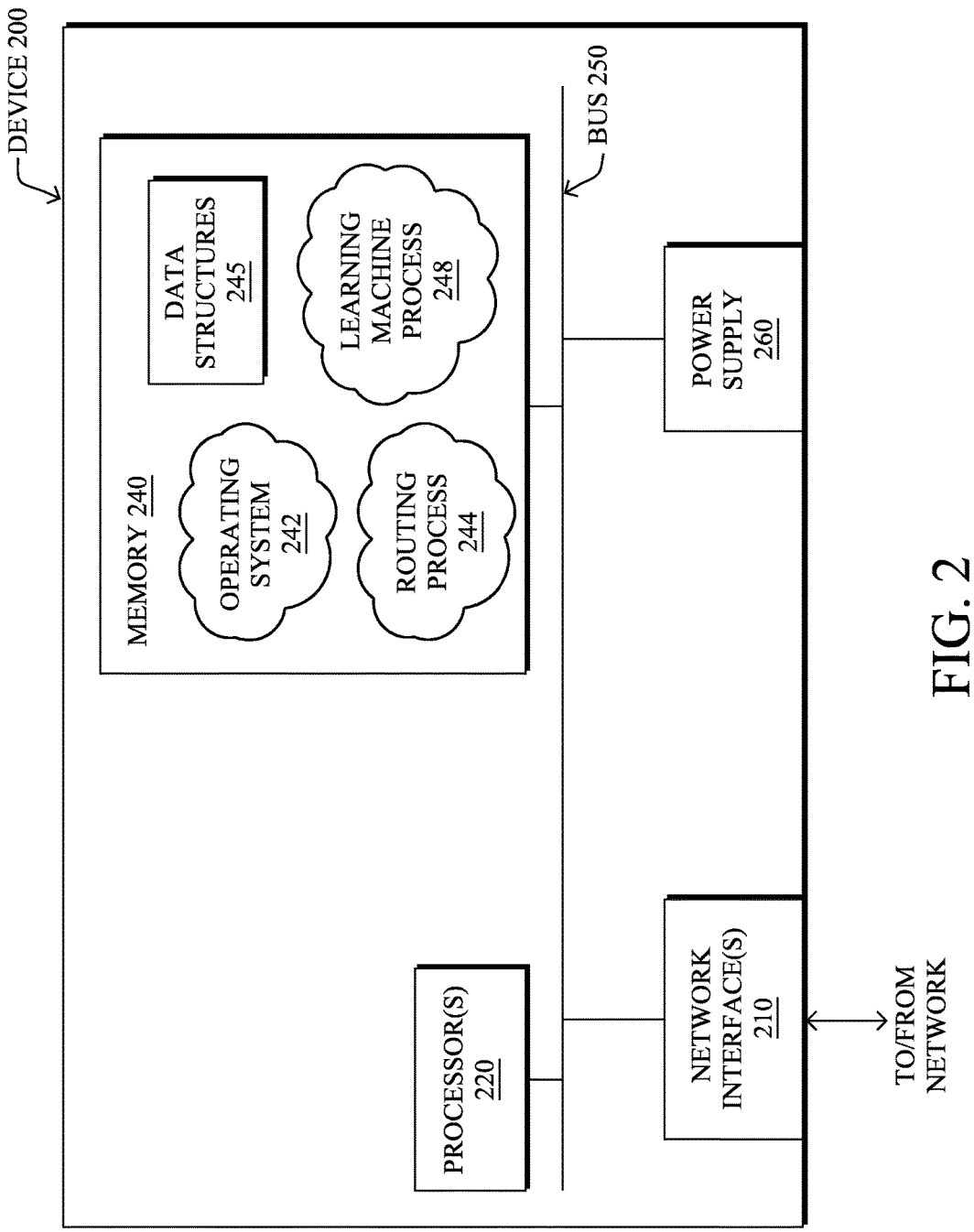
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
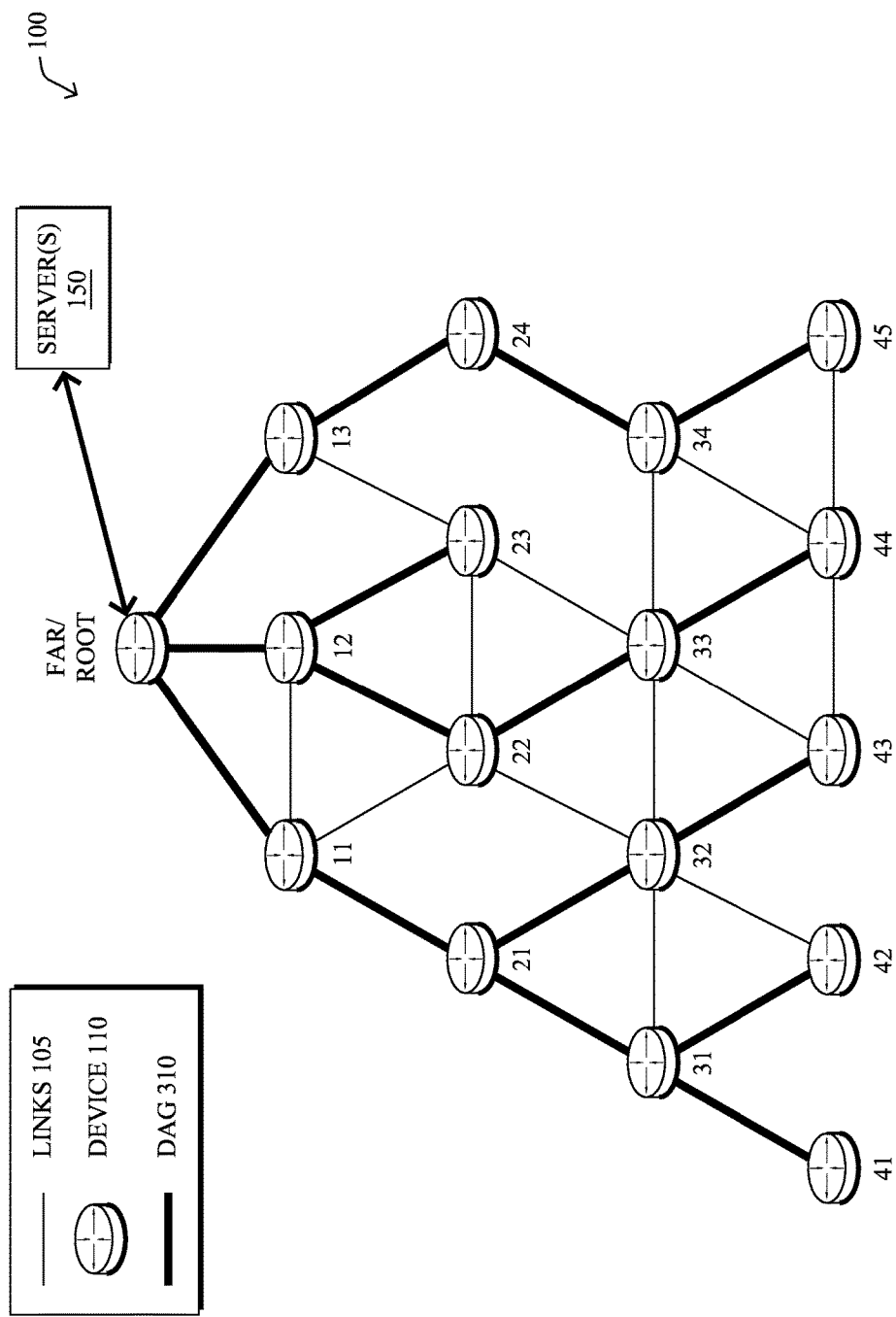
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad \text{(Eq. 1)}$$

Figure 4:
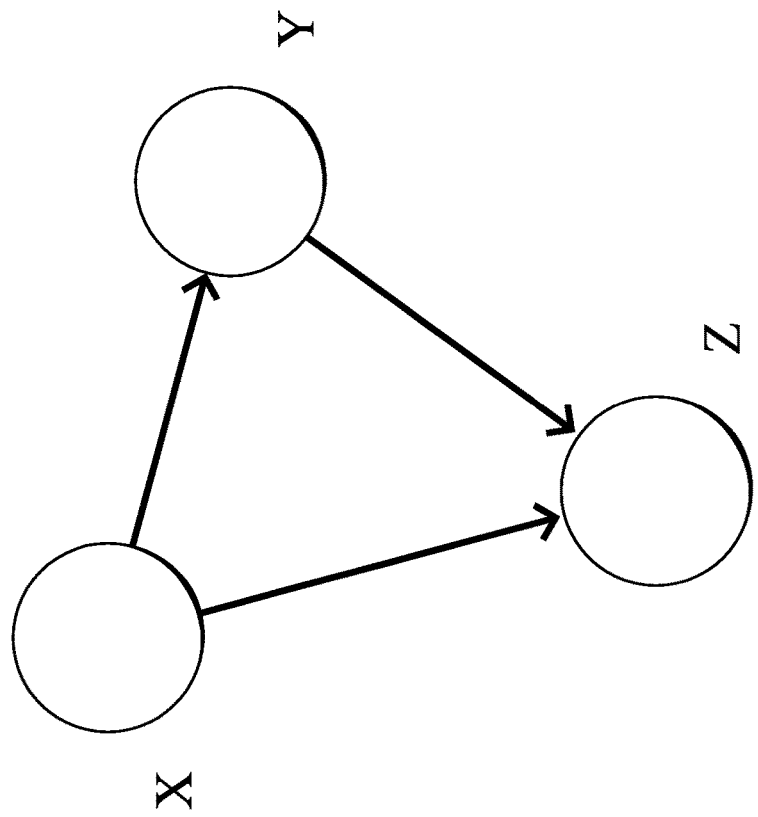
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i+\varepsilon \quad \text{(Eq. 2)}$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\varepsilon$ is a Gaussian random variable used to model the uncertainty and/or the noise on the estimate $M_i$. The linear regression consists in finding the weight vector b that fulfills the maximum likelihood criterion (which coincides with the least square criterion when $\varepsilon$ is Gaussian). In particular, the optimal b must minimize the Mean Squared Error (MSE):

$$\text{MSE}=\Sigma_i(b^T x_i-y_i)^2/N \quad \text{(Eq. 3)}$$

where N is the total number of input data points, i.e., i=1, . . . , N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\varepsilon$ is not Gaussian.

Figure 5:
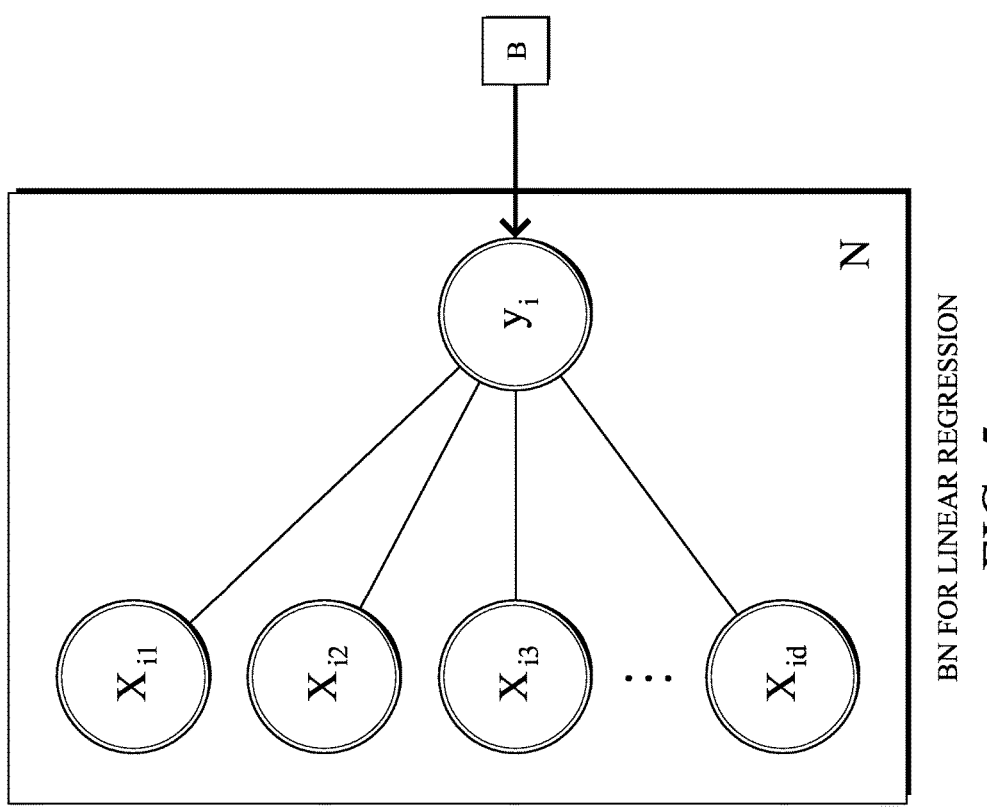
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

Optimizing Network Parameters Based on a Learned Network Performance Model

LLNs tend to be extremely difficult to configure, thereby making them prone to sub-optimal performance induced by both sub-optimal network parameters at the individual node level (e.g., transmission power, timeout parameters, etc.) and routing topologies. It is worth pointing out that this is a recurrent customer request: simplify the configuration work especially in presence of complex protocol enables with a myriad of knobs. Current routing metrics attempt to capture link quality as well as possible (e.g., using the path ETX), but the complex dependency of the link delay on many parameters (such as the RSSI, the physical distance between the nodes, the temperature, the humidity, the traffic generated and processed by neighboring nodes just to cite a few) make this approach yield very coarse and rough approximations of the optimal path. Similarly, numerous network parameters at the link layer and physical layers (such as NACKs, ACKs, duplicate transmissions) have a strong influence on the overall QoS such as the end-to-end delay, and they exhibit a strong inter-dependence with each other.

The techniques herein specify an approach consisting in making use of a more accurate mapping between such parameters, e.g., "network characteristics," and the QoS, e.g., "network performance metric," to optimize the routing topology and other network parameters such that the QoS meets the requirements imposed by the SLA. In particular, we rely on a learning machine (LM), for estimating this mapping.

Said differently, the techniques herein rely on constructing a predictive model of the QoS in LLNs for achieving either centralized or decentralized optimization of the network parameters. This fundamentally contrasts with existing approaches that cannot take into account a large number of parameters to predict local performances and consequently tune local parameters.

Notably, mapping network parameters to functions with the goal of optimizing QoS has been a long practiced art in the area of wired computer networks. In its most basic form, link and node metrics/weights were tuned using off-line tools and general practice to achieve the desired level of optimization in the network. While tuning link metrics, the physical layer of the link (fiber-optic or copper), geographical length, commonality with nodes, etc. are all taken into account. That being said, in a more deterministic network such a mapping is simpler than in LLNs that are inherently stochastic, and such techniques are thus not suitable for LLNs.

Figure 6:
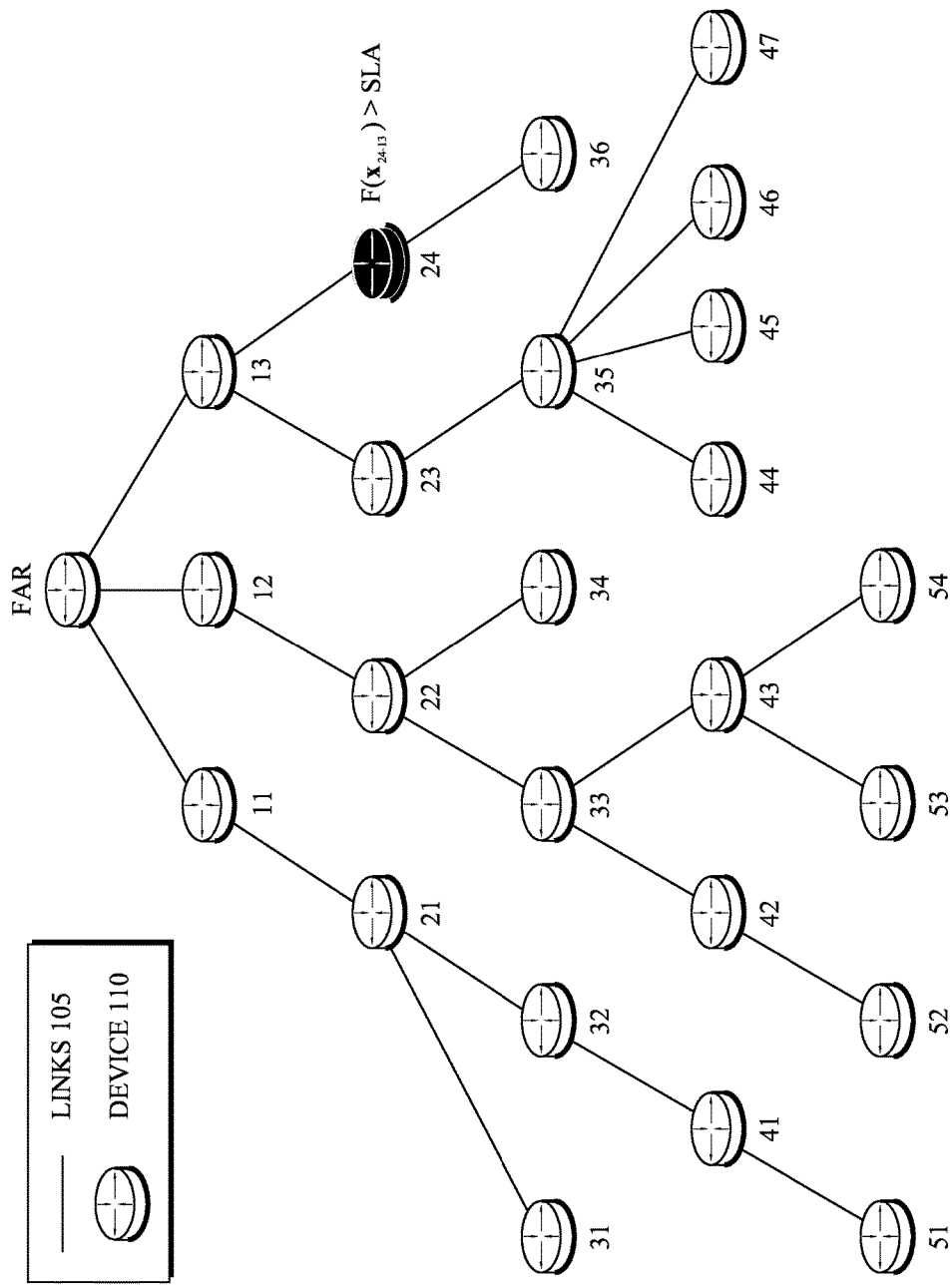
FIGS. 6-8 illustrate an example of optimizing network parameters based on a learned QoS model.
Figure 7:
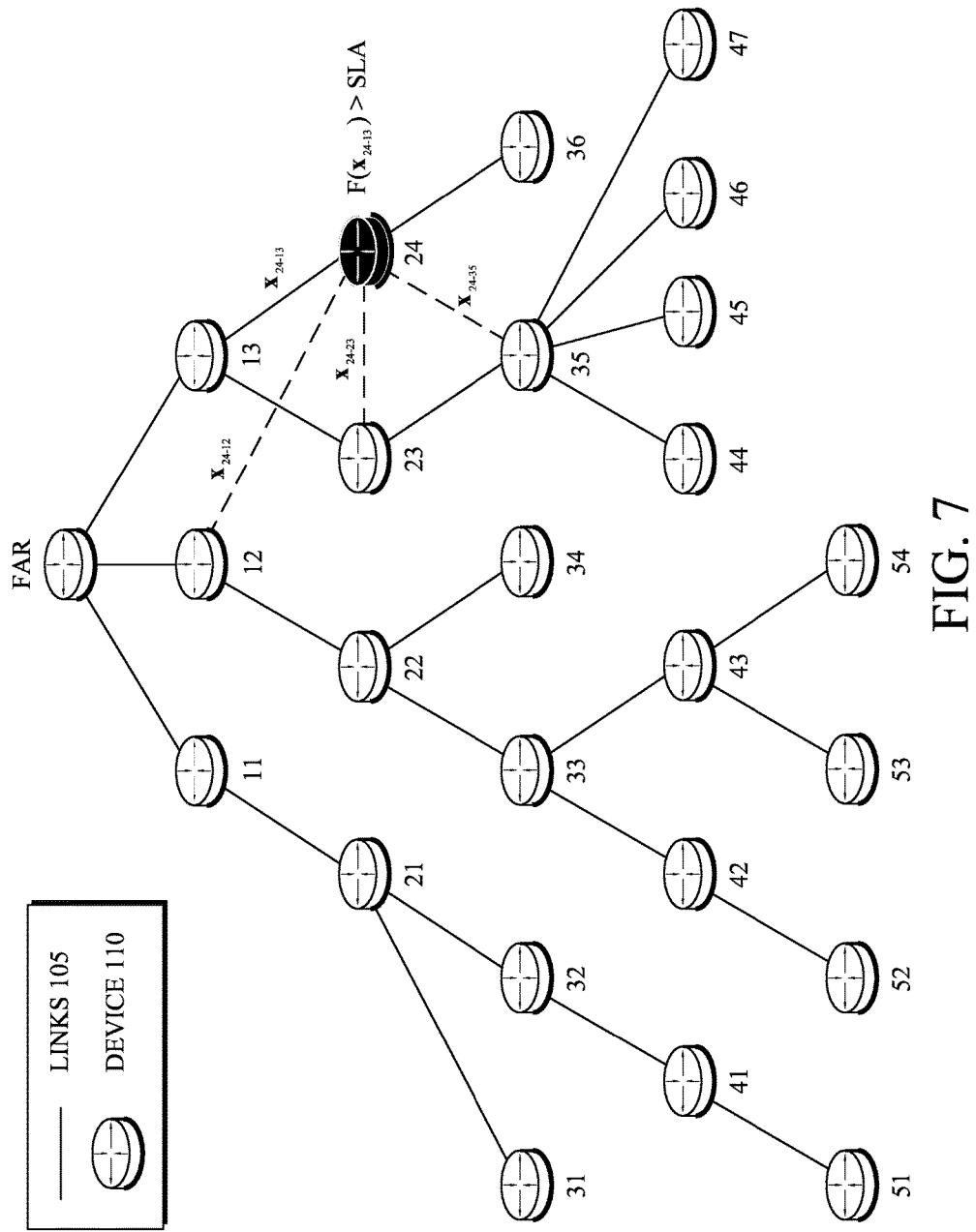
Figure 8:
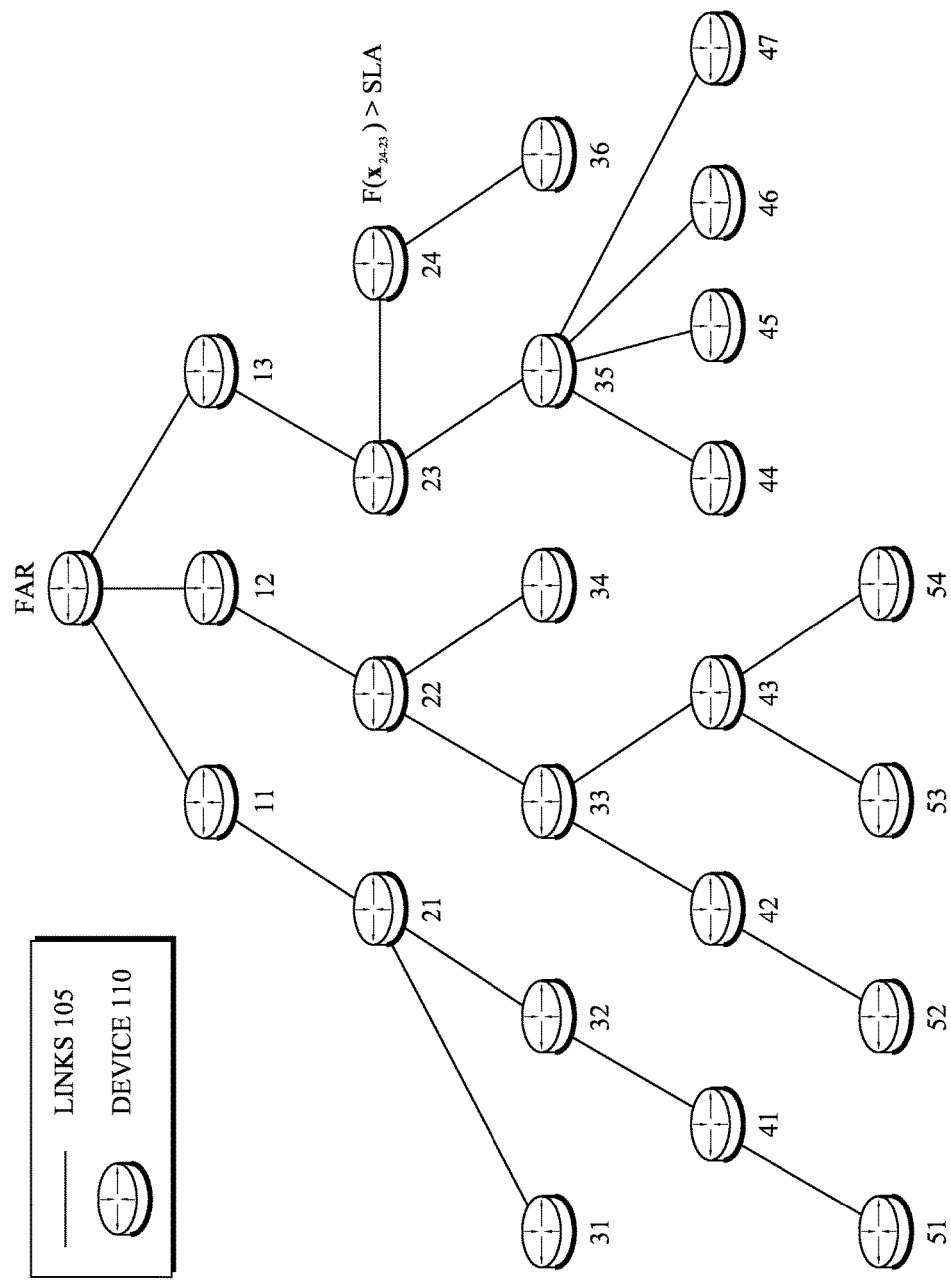

Operationally, as shown in (and with general reference to) FIGS. 6-8, the techniques herein proposes to optimize network parameters (e.g., picking the routing parent, dynamically adjust transmission power, timeouts, retrials, etc.) of a given node $n\_i$ based on a prediction of its QoS $y\_i$. In other words, the techniques herein construct a function F that maps a given input state vector $x\_i$ to an estimated QoS value $y\_i$. The state vector $x\_i$ describes as accurately as possible the various properties of $n\_i$ (e.g., hop count, rank, path and link ETX, number of children, etc.). As a result, $F(x\_i)$ is much more suitable as a metric for adjusting the network parameters, and in particular the routing topology, because it yields a more accurate and generic estimate of the link quality than just the path or link ETX, for instance. In an example learning machine implementation, a proposed function $F(x\_i)$ is a linear combination of the input vector of properties $x\_i$ of node i with a vector w of parameters, such that the scalar product of $x\_i$ and w is $y\_i$. As a result, F offers a compact and synthetic representation of the relationship between network properties that make up the state of a given node $n\_i$ and its QoS $y\_i$ (typically by QoS reference is made to the delay). It is worth pointing out that some parameters have extremely complex inter-dependency, which may be local and/or end-to-end. The techniques herein are directed to an LM-based algorithm used to help nodes to locally adapt their parameters in order to optimize its delay. Note the techniques herein do not make any assumption regarding of the form of F and the methods employed for optimizing its parameters.

In one embodiment of the techniques herein, the vector w is sent to all nodes in the networks using an IPv6 multicast message that is multicasted or broadcasted at the link layer to all nodes in the network at regular time intervals (which can be adjusted as a function of the variability of w), such that each node may compute an estimate of its QoS based on its current configuration. In another embodiment, since the vectors $x\_i$ and w may vary with nodes (so does the function F), such a message may be sent to different groups of nodes using different multicast group messages). To that end, the LM may decide to group nodes according to the similarities that they share in terms of features, value of the function F and vector w.

Note that this approach requires each property in $x\_i$ to be available locally at the node level. Using lightweight optimization strategies such as gradient descent or inline adaptive learning, one may locally adjust these parameters such that the QoS of the node $n\_i$ is optimal. For instance, in the case of the parent selection choice (currently based on a very coarse metrics such as the ETX), the algorithm may be example "Algorithm 1," as follows, where neighbors would denote the list of all potential parents (this list could contain more than just the backup parents prescribed by a routing protocol such as RPL):

```
- Algorithm 1 -
set n_best to current parent
set y_best to infinity
for each node n_j in neighbors:
    compute x_i' for n_j as parent
    compute y = w * x_i'
    if y < y_best:
        y_best = y
        n_best = n_j
change parent to n_best
- End -
```

Here, a fundamental aspect herein is the ability for the node to predict the QoS that it would have if it changed to a new parent. Similarly, one may use this knowledge to is optimize a continuous parameter such as a backoff t, in example "Algorithm 2," as follows:

```
- Algorithm 2 -
delta_d: learning step
d: learning direction
tol: termination criterion
randomly pick d among {+1, -1}
initialize y_change to some value large than tol
while y_change > tol:
    set t to t + d * delta_d # update the parameter
    update x_i with new t # update the feature vector
    set y' to w * x_i # compute the expected delay
    # compute the average change in delay (low pass filter)
    y_change = alpha * y_prime + (1-alpha) * (y - y')
    if y' < y: # expected delay decreased (better solution)
        increment n_improvements
    else: # expected delay increased (worse solution)
        reset n_improvements to 0
    # store this delay for next iteration
    set y to y'
    if n_improvements == 0:
        set d to -d # reverse direction of learning
        decrease delta_d # slow down learning
    elif n_improvements >= 2:
        increase delta_d # accelerate learning
- End -
```

Note that the above algorithms are derived from the well-known approach of inline adaptive learning in robotics. However, this algorithm is very lightweight, both from a computational and memory perspective.

In another embodiment, the vector w is not broadcasted, but the FAR is estimating in real time the QoS of each node in the network, and verifying that they are within the SLA. When a node $n\_i$ does not meet the requirements imposed by the SLA, the FAR performs a centralized optimization of the parameters of n_i in order to bring its QoS back within the SLA. If a set of appropriate parameters is found, a message is sent to n_i to ask it to adjust its parameters accordingly. This change may either involve some local repair of the routing topology (by selecting another parent or temporarily blacklisting some neighboring nodes). In this embodiment, the type of algorithms used by the FAR may range from stochastic descent to convex optimization, or evolutionary strategies if the solution space exhibits a very large dimensionality and/or some strong non-linearities.

Figure 9:
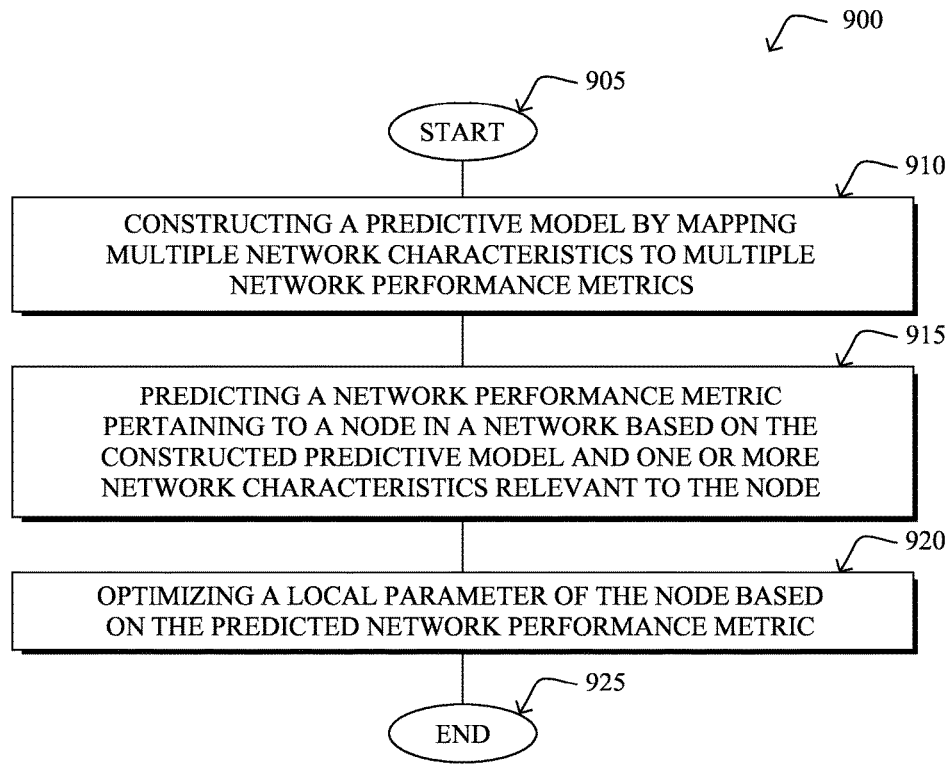
FIG. 9 illustrates an example simplified procedure for optimizing network parameters based on a learned network performance model.

FIG. 9 illustrates an example simplified procedure for optimizing network parameters based on a learned network performance model. The procedure 900 may start at step 905, continue to step 910, and so forth.

At step 910, a predictive model is constructed by mapping multiple network characteristics to multiple network performance metrics. Then, at step 915, a network performance metric pertaining to a node in a network is predicted based on the constructed predictive model and one or more network characteristics relevant to the node. Also, at step 920, a local parameter of the node is optimized based on the predicted network performance metric. The procedure 900 may illustratively end at step 925. The techniques by which the steps of procedure 900 may be performed, as well as ancillary procedures and parameters, are described in detail above.

It should be noted that the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for optimizing network parameters based on a learned network performance model, e.g., a QoS model. In particular, as of now, most if not all network parameters are hard-coded and non-adaptive, thereby making LLNs particularly sensitive to environmental changes, both in time and in space. The techniques herein propose a method for performing optimization based on a predictive model learned from past experimental data whereby each node would adapt its control parameters to the local conditions it is experiencing.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
constructing, by a learning machine, a predictive model, wherein the predictive model maps a given input state vector representing multiple network characteristics of a node in a network to multiple network performance metrics as an estimated quality of service value, wherein the given input state vector describes at least a hop count for the node, a path and link expected transmission count (ETX) and a number of children associated with the node;
predicting a network performance metric pertaining to the node in the network at a device level based on the constructed predictive model and one or more network characteristics relevant to the node, wherein the node is a device in the network;
adaptively adjusting a local parameter of the node at the device level so that the predicted network performance metric is the best predicted performance metric output by the predictive model, wherein the local parameter, the given input state vector, and the estimated quality of service value have a linear relationship, wherein the local parameter is a local routing topology parameter of the node at the device level;
determining a new parent node of the node according to a topology of the network; and
predicting the network performance metric pertaining to the node with the determined new parent node.

2. The method according to claim 1, further comprising:
sending an instruction to the node to locally optimize the local parameter.

3. The method according to claim 1, further comprising:
reducing a transmission delay of the node by the optimizing the local parameter of the node.

4. The method according to claim 1, further comprising:
transmitting a message to nodes in the network, the message including an indication of vectors.

5. The method according to claim 1, further comprising:
receiving, from the node, a message indicating the one or more network characteristics relevant to the node.

6. The method according to claim 1, further comprising:
sending the predictive model to the nodes in the network, such that the predictive model can be utilized by the nodes to optimize local parameters of the nodes.

7. The method according to claim 1, wherein the network performance metrics include one or more of a quality of service (QoS) value, a class of service (CoS) value, and a transmission delay.

8. An apparatus, comprising:
one or more network interfaces that communicate with a network;
a processor coupled to the one or more network interfaces and configured to execute a process; and
a memory configured to store program instructions which contain the process executable by the processor, the process comprising:
constructing, as a learning machine, a predictive model, wherein the predictive model maps a given input state vector representing multiple network characteristics of a node in a network to multiple network performance metrics as an estimated quality of service value, wherein given input state vector describes at least a hop count for the node, a path and link expected transmission count (ETX) and a number of children associated with the node;
predicting a network performance metric pertaining to the node in the network at a device level based on the constructed predictive model and one or more network characteristics relevant to the node, wherein the node is a device in the network;
adaptively adjusting a local parameter of the node at the device level so that the predicted network performance metric is the best predicted performance metric output by the predictive model, wherein the local parameter, the given input state vector, and the estimated quality of service value have a linear relationship, wherein the local parameter is a local routing topology parameter of the node at the device level;
determining a new parent node of the node according to a topology of the network; and
predicting the network performance metric pertaining to the node with the determined new parent node.

9. The apparatus according to claim 8, wherein the process further comprises:
sending an instruction to the node to locally optimize the local parameter.

10. The apparatus according to claim 8, wherein the process further comprises:
reducing a transmission delay of the node by the optimizing the local parameter of the node.

11. The apparatus according to claim 8, wherein the process further comprises:
transmitting a message to nodes in the network, the message including an indication of vectors.

12. The apparatus according to claim 8, wherein the process further comprises:
receiving, from the node, a message indicating the one or more network characteristics relevant to the node.

13. The apparatus according to claim 8, wherein the process further comprises:
sending the predictive model to the nodes in the network, such that the predictive model can be utilized by the nodes to optimize local parameters of the nodes.

14. The apparatus according to claim 8, wherein the network performance metrics include one or more of a quality of service (QoS) value, a class of service (CoS) value, and a transmission delay.

15. A tangible non-transitory computer readable medium storing program instructions that cause a computer to execute a process, the process comprising:
constructing, as a learning machine, a predictive model, wherein the predictive model maps a given input state vector representing multiple network characteristics of a node in a network to multiple network performance metrics as an estimated quality of service value;
predicting a network performance metric pertaining to the node in the network at a device level based on the constructed predictive model and one or more network characteristics relevant to the node, wherein the node is a device in the network, wherein given input state vector describes at least a hop count for the node, a path and link expected transmission count (ETX) and a number of children associated with the node;
adaptively adjusting a local parameter of the node at the device level so that the predicted network performance metric is the best predicted performance metric output by the predictive model, wherein the local parameter, the given input state vector, and the estimated quality of service value have a linear relationship, wherein the local parameter is a local routing topology parameter of the node at the device level;
determining a new parent node of the node according to a topology of the network; and
predicting the network performance metric pertaining to the node with the determined new parent node.

* * * * *